Oct. 9, 1962 E. J. SHURTZ 3,057,512
PACKAGE VENDING MACHINE
Filed Jan. 18, 1961 2 Sheets-Sheet 1

INVENTOR.
EARL JACK SHURTZ
BY
Hubert Miller
ATTORNEY

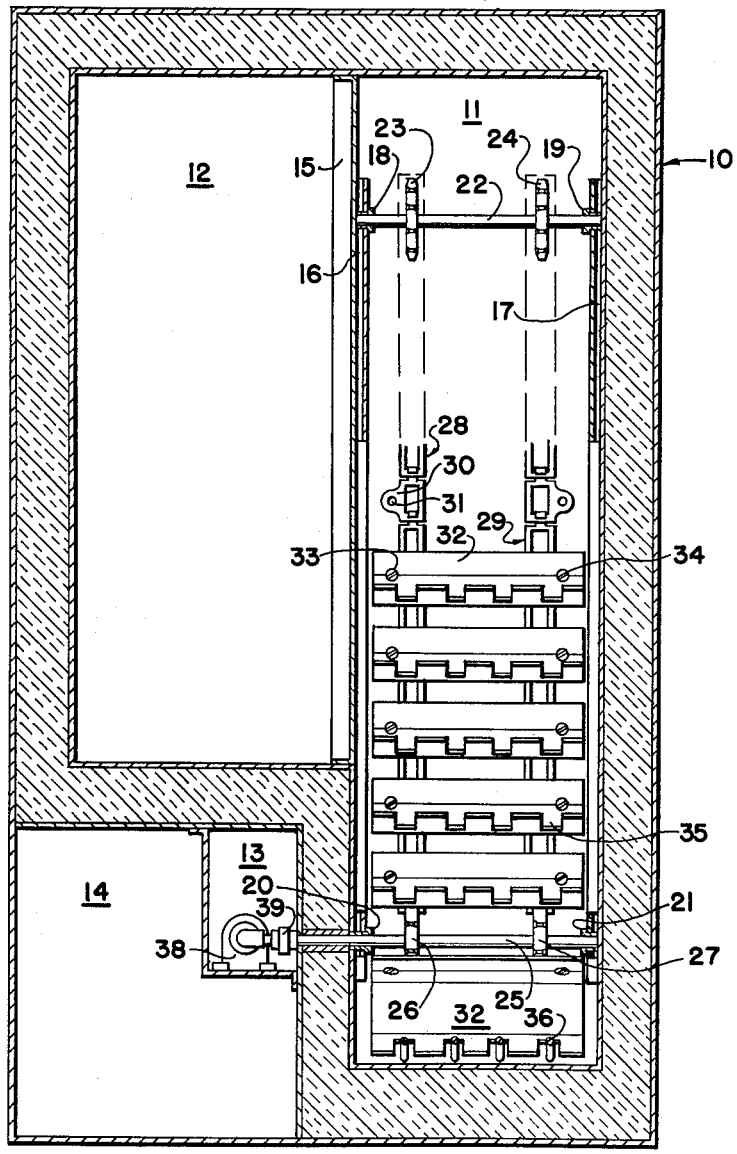

United States Patent Office 3,057,512
Patented Oct. 9, 1962

3,057,512
PACKAGE VENDING MACHINE
Earl Jack Shurtz, 3817 E. Funston, Wichita, Kans.
Filed Jan. 18, 1961, Ser. No. 83,437
4 Claims. (Cl. 221—77)

This invention relates generally to coin controlled vending machines and more particularly to a motor driven package handling mechanism therefor, and to a control for the handling mechanism.

It is an important object of the invention to provide a machine which will handle and vend relatively large and bulky packages such as packaged ice, charcoal, ice cream salt, etc.

Simplicity in design is also an important object. The handling mechanism is so designed that it eliminates the usual complicated package ejecting mechanism, and delivers the package by gravity alone.

It is another important object of the invention to provide an electrical control circuit for the handling mechanism, with the package delivery cycle being initiated by the insertion of a coin into the machine and terminated by the delivery of the package through a delivery door.

The invention together with other objects, will be more clearly understood when the following description is read in connection with the accompanying drawing, in which:

FIG. 2 is a transverse vertical sectional view taken along the line 2—2 of FIG. 1.

Figures 1, 3:
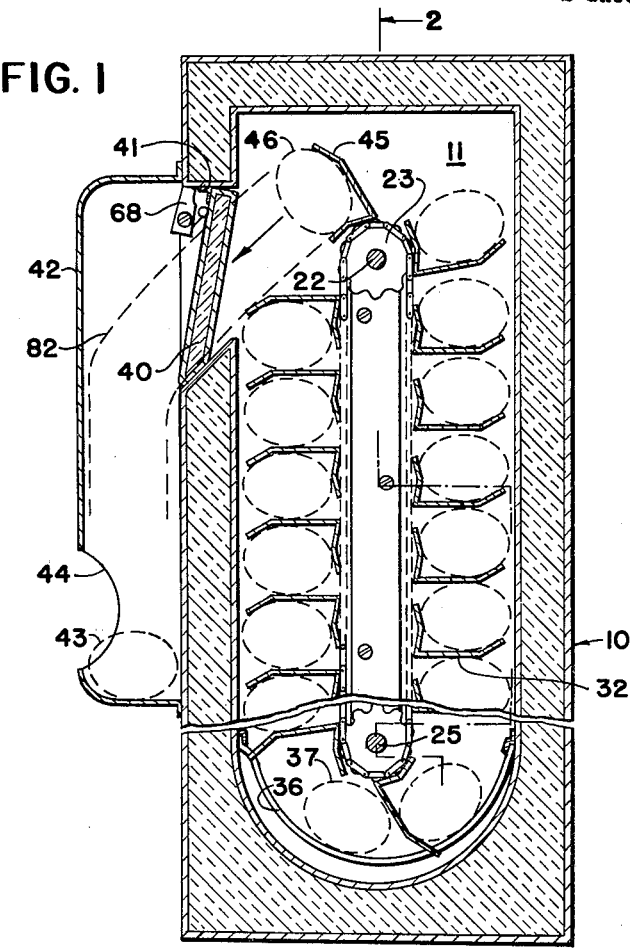
FIG. 1 is a fore and aft vertical sectional view through the machine showing details of the package handling assembly, and is taken along the plane indicated by the line 1—1 of FIG. 2.
FIG. 3 is a wiring diagram of a preferred type of electrical circuit for controlling the operation of the machine.

In FIGS. 1 and 2 of the drawing the machine is illustrated as having an upright cabinet 10 with thick insulated walls, which define an upright area 11 which houses a package handling assembly, a storage area 12, a motor compartment 13, and a compartment 14 which may house a mechanical refrigeration unit if the machine is to be used for vending refrigerated articles.

In the compartment 11 metal angle strips 15, 16 and 17 are rigidly secured. The strips 16 and 17 are positioned in opposite parallel relationship, and support aligned bearings 18, 19, 20 and 21 near their respective upper and lower ends.

Bearings 18 and 19 journal the opposite ends of a shaft 22, which carries idler sprockets 23 and 24. Similarly, aligned bearings 20 and 21 journal motor driven shaft 25 which carries sprockets 26 and 27.

Sprockets 23 and 26 are in vertical alignment and carry a conveyor chain 28. Similarly, sprockets 24 and 27 are in vertical alignment and carry a conveyor chain 29. Alternate links of the two conveyor chains carry integral outwardly projecting flanges 30 which are provided with threaded perforations 31. A series of shelves 32 are secured to the chains 28 and 29 by means of bolts or metal screws 33 and 34 which pass through the opposite ends of the shelves and into the perforations 31 in oppositely positioned links of the chains. The cross sectional shape of the shelves 32 is better shown in FIG. 1.

As better shown in FIG. 2, the outer edges of shelves 32 are serrated. This permits the outwardly projecting tines 35 to straddle a series of juxtaposed arcuate bars 36, as clearly shown in the lower portion of FIG. 2, as the respective shelves reverse their direction of travel at the lower end of the conveyor assembly. As better shown in FIG. 1 the bars 36 simply serve as slides along which the individual packages 37 are moved by the shelves 32 as the shelves reverse their direction of travel, the bars serving to maintain the packages in proper position on their respective shelves.

A geared electrical motor 38 is mounted in compartment 13 and is coupled to shaft 25 by means of a coupling 39.

The cabinet 10 is provided with a delivery door 40 which is hinged at 41 along its upper horizontal edge. A guide chute 42 is secured to the front cabinet wall adjacent door 40, and serves to receive and guide a package delivered through door 40 to the lower end of the chute along the dotted line path shown in FIG. 1, and to the position indicated by the numeral 43, where it is easily accessible to the operator through the opening 44 in the lower end of the chute.

From FIG. 1 it will be evident that when the shelf 45 at the upper end of the conveyor is moved to the position shown, the package 46 will be delivered by gravity through the door 40 and to the bottom of the chute 42. If the conveyor travel is stopped immediately with the shelf 45 in approximately the position shown, it is also evident that no other package will be delivered until the conveyor is again operated and the following shelf reaches the position of shelf 45.

The coin handling mechanism is not shown in detail because it does not constitute an essential part of my invention. Most any conventional coin handling mechanism will serve the purpose. The coin actuated control for the conveyor operating motor will now be described.

FIG. 3 illustrates diagrammatically a plurality of interrelated electrical circuits which control the operation of the motor 38, and hence the operation of the package conveyor assembly.

A three-way change-over switch 50 is associated with coin chute 47, and is positioned to be moved about its pivot 51 by a coin dropping downward through the chute.

Similarly a normally closed circuit breaking switch 68 is associated with delivery door 40, and is positioned to be moved in a direction to break the circuit in which it is interposed when a package is dumped from a conveyor shelf and physically forces door 40 to an open position momentarily, as illustrated by the broken lines.

Operation

Generally, the motor control system includes an initiating circuit, a holding circuit, a motor control circuit, and a motor operating circuit.

Normally arm 54 of the switch 50 electrically connects contacts 51 and 52. When a coin 53 drops downward through chute 47, the coin contacts switch arm 81 and forces the switch element to pivot about 51, momentarily causing arm 54 to connect contacts 51 and 55. This momentary connection makes an initiating circuit through lines 57, 58, relay coil 56, line 59, switch arm 54, lines 60, 61, and 62.

The momentary energizing of relay 56 causes arm 63 to connect contacts 64 and 65, creating a holding circuit through lines 57, 58, relay coil 56, line 66, arm 63, line 67, switch 68, lines 69 and 62.

In the meantime, the arm 54 of change-over switch 50 has returned to its normal position, connecting contacts 51 and 52. This now makes a motor control circuit through lines 57, 71, 72, control relay coil 70, line 73, switch arm 54, lines 59, 66, arm 63, line 67, switch 68, and lines 69 and 62. The making of this motor control circuit energizes the motor control relay 70, which causes arm 75 to electrically connect contacts 76 and 77.

This movement of arm 75 makes the motor operating circuit through lines 57, 71, 79, motor 38, line 80, arm 75, lines 61 and 62, starting the motor 38.

The described circuits, save the initiating circuit, remain closed and the motor continues to operate until package 46 falls from shelf 45, opens door 40, and falls into a delivery position, 43.

The opening of door 40 opens switch 68, which breaks the holding circuit. This in turn breaks the motor control circuit and the motor operating circuit, thus stopping the motor and the conveyor, and placing the entire mechanism in condition for delivery of the next package by the dropping of an additional coin.

Having described the invention with sufficient clarity to enable those familiar with this art to construct and use it, I claim:

1. A vending machine comprising:
   a cabinet defining compartment for articles to be vended;
   a pair of spaced parallel shafts journaled transversely, one near each end of the compartment;
   sprockets on said shafts;
   an electric motor operably connected to drive one of said shafts to drive the assembly;
   an endless chain type article handling conveyor assembly strung over said sprockets, said assembly including spaced shelves fixed to spaced links of chain, each shelf being capable of carrying at least one article to be vended as the conveyor moves over its sprockets, and capable of releasing the carried article to the force of gravity as the shelf reaches a point of reversal in travel direction near one end of its path of travel;
   an article delivery chute having one end in communication with said compartment at a location to receive an article moved by gravity from any one of said shelves;
   a gravity closed swinging door located between the conveyor assembly and the said one end of said article delivery chute in a position to be opened by an article moving by gravity from any one of said shelves into the said one end of said delivery chute;
   a coin receiving chute through which a coin must gravitate downward when inserted into the receiving end of the chute;
   an initiating circuit;
   an auxiliary relay in said initiating circuit;
   a coin actuated three-way change-over switch in the initiating circuit and which switch is normally open with respect to such circuit, said switch being associated with said coin chute in a position to be closed momentarily by a coin gravitating through the chute, and to thus momentarily make the initiating circuit and energize the auxiliary relay;
   a holding circuit in which said auxiliary relay is also interposed, said auxiliary relay when energized acting to make and maintain the holding circuit in response to the momentary making of the initiating circuit by the coin actuated switch;
   a motor control circuit in which said change-over switch is also interposed, said switch being closed with respect to this circuit save when momentarily opened by a coin dropping through the chute, said auxiliary relay serving to maintain the motor control circuit closed so long as the holding circuit remains closed;
   a motor control relay in the motor control circuit;
   a normally open motor operating circuit, said motor control relay serving to make and maintain the motor operating circuit closed so long as the motor control circuit remains closed;
   and a normally closed switch interposed in said holding circuit and responsive to the opening of said swinging door by the passage of an article dumped from the article handling mechanism to break such circuit, in response to which the opening of the auxiliary relay breaks the motor control circuit, and the consequent opening of the motor control relay breaks the motor operating circuit.

2. In a coin controlled article vending mechanism which includes an enclosed article handling and gravity dumping mechanism, an electric motor operably connected to drive said handling mechanism, a coin chute through which inserted coins drop downward for a distance, and a normally closed door which is opened in response to physical contact by an article dumped from said article handling mechanism, a control system for said motor comprising:
   an initiating circuit;
   an auxiliary relay in said initiating circuit;
   a coin actuated three-way change-over switch in the initiating circuit and which switch is normally open with respect to such circuit, said switch being associated with said coin chute in a position to be closed momentarily by a coin gravitating through the chute, and to thus momentarily make the initiating circuit and energize the auxiliary relay;
   a holding circuit in which said auxiliary relay is also interposed, said auxiliary relay when energized acting to make and maintain the holding circuit in response to the momentary making of the initiating circuit by the coin actuated switch;
   a motor control circuit in which said change-over switch is also interposed, said switch being closed with respect to this circuit save when momentarily opened by a coin dropping through the chute, said auxiliary relay serving to maintain the motor control circuit closed so long as the holding circuit remains closed;
   a motor control relay in the motor control circuit;
   a normally open motor operating circuit, said motor control relay serving to make and maintain the motor operating circuit closed so long as the motor control circuit remains closed;
   and a normally closed switch interposed in said holding circuit and responsive to the opening of said swinging door by the passage of an article dumped from the article handling mechanism to break such circuit, in response to which the opening of the auxiliary relay breaks the motor control circuit, and the consequent opening of the motor control relay breaks the motor operating circuit.

3. A machine for vending bulk packages comprising:
   a cabinet defining compartment for the packages;
   a pair of spaced-apart parallel shafts journaled transversely, one near each end of the compartment;
   sprockets on said shafts;
   an electric motor operably connected to drive one of said shafts to drive the sprocket;
   an endless chain type conveyor assembly strung over said sprockets and adapted when fully loaded for moving packages in spaced-apart parallel paths tangent to curved paths of reversal located at said compartment ends, said assembly including spaced-apart shelves fixed to links of said chain, said shelves individually capable of carrying at least one package as the conveyor assembly moves over its sprockets and serrated so as to present a plurality of spaced-apart tine elements, each shelf capable of releasing a carried package to the force of gravity as the shelf reaches a first point of reversal in travel direction at a first end of the compartment;
   bar rails adjacent a second point of reversal in travel direction at the other compartment end and defining a curved guide path concentric with the axis of the sprocket at that end, said bar rails operatively intercalated with the tine elements of said shelves for maintaining the packages in proper position on the respective shelves;
   a delivery chute having one end in communication with said compartment at a location to receive a package moved by gravity from any one of said shelves;
   a gravity closed swinging door supported by the cabinet in a position to be opened by a package moving as aforesaid from said shelves through said delivery chute;

a normally open electrical circuit which includes said motor;

a normally open coin operated switch in said circuit;

a normally closed switch in said circuit operably associated with said door and responsive to the opening of the door by a package gravitating therethrough;

and a normally closed stop switch in said circuit operably associated with said door and responsive to the opening of the door by a package gravitating therethrough to break the motor operating circuit and thus stop operation of the conveyor assembly immediately after one package is released therefrom.

4. The machine of claim 3, said shelves having a generally flat construction and being horizontally disposed effective for supporting the packages therebetween when traversing both sides of their parallel paths, said tine elements formed at the outer edge of the plates with respect to their paths of motion and being forwardly curved.

References Cited in the file of this patent
UNITED STATES PATENTS

| | | |
|---|---|---|
| 2,272,750 | Miller | Feb. 10, 1942 |
| 2,496,304 | Muffly | Feb. 7, 1950 |
| 2,564,552 | Verdery | Aug. 14, 1951 |
| 2,905,360 | Mihalek | Sept. 22, 1959 |